United States Patent
Suzuki et al.

(10) Patent No.: US 10,882,973 B2
(45) Date of Patent: Jan. 5, 2021

(54) POLYURETHANE YARN, AS WELL AS FABRIC AND SWIMWEAR USING SAME

(75) Inventors: Katsuya Suzuki, Shiga (JP); Toshihiro Tanaka, Shiga (JP)

(73) Assignee: TorayOpelontexCo., Ltd., Osaka (JP)

( * ) Notice: Subject to any disclaimer, the term of this patent is extended or adjusted under 35 U.S.C. 154(b) by 6 days.

(21) Appl. No.: 14/127,633

(22) PCT Filed: Jun. 12, 2012

(86) PCT No.: PCT/JP2012/064957
§ 371 (c)(1),
(2), (4) Date: Dec. 19, 2013

(87) PCT Pub. No.: WO2012/176648
PCT Pub. Date: Dec. 27, 2012

(65) Prior Publication Data
US 2014/0109280 A1    Apr. 24, 2014

(30) Foreign Application Priority Data
Jun. 23, 2011    (JP) .................................. 2011-139040

(51) Int. Cl.
| | | |
|---|---|---|
| C08K 5/107 | (2006.01) | |
| D01F 6/70 | (2006.01) | |
| D01F 1/10 | (2006.01) | |
| C08G 18/48 | (2006.01) | |
| D04B 21/18 | (2006.01) | |
| C08G 18/32 | (2006.01) | |
| C08G 18/76 | (2006.01) | |
| C08G 18/10 | (2006.01) | |
| C08K 3/26 | (2006.01) | |
| D02G 3/04 | (2006.01) | |
| A41D 7/00 | (2006.01) | |

(52) U.S. Cl.
CPC ............. *C08K 5/107* (2013.01); *C08G 18/10* (2013.01); *C08G 18/3228* (2013.01); *C08G 18/4854* (2013.01); *C08G 18/7671* (2013.01); *C08K 3/26* (2013.01); *D01F 1/10* (2013.01); *D01F 6/70* (2013.01); *D02G 3/045* (2013.01); *D04B 21/18* (2013.01); *A41D 7/00* (2013.01); *Y10T 428/249921* (2015.04)

(58) Field of Classification Search
USPC ........ 524/349, 86, 101, 108, 115, 127, 140, 524/141, 145, 151, 152, 283, 287, 290, 524/291, 299, 323, 324, 330, 333, 334, 524/335, 336; 428/364, 372, 394, 395, 428/211; 442/302, 304; 264/211.11, 264/165, 176.1
See application file for complete search history.

(56) References Cited

U.S. PATENT DOCUMENTS

| | | | | |
|---|---|---|---|---|
| 4,525,420 A | | 6/1985 | Imai | ............................... 428/372 |
| 5,359,732 A | * | 11/1994 | Waldman | ................. A41D 7/00 |
| | | | | 2/243.1 |
| 5,626,960 A | * | 5/1997 | Carney | .................... C08K 3/26 |
| | | | | 264/204 |
| 6,248,197 B1 | * | 6/2001 | Nakanishi | .............. D01D 5/253 |
| | | | | 156/167 |
| 6,531,514 B2 | * | 3/2003 | Carney | ..................... D01F 1/10 |
| | | | | 106/463 |
| 6,846,866 B2 | * | 1/2005 | Houser | .................. C08G 18/10 |
| | | | | 428/364 |
| 8,277,941 B2 | * | 10/2012 | Tanaka | ...................... D01F 1/07 |
| | | | | 428/364 |
| 2010/0249285 A1 | * | 9/2010 | Tanaka | ................. C08G 18/285 |
| | | | | 524/100 |

FOREIGN PATENT DOCUMENTS

| | | | |
|---|---|---|---|
| EP | 0791085 B1 | 11/2000 | |
| JP | 59-133248 A | 7/1984 | |
| JP | 60-43444 A | 3/1985 | |
| JP | 61-26612 A | 2/1986 | |
| JP | 61-35283 A | 2/1986 | |
| JP | 02-289516 A | 11/1990 | |
| JP | 03059150 | * 3/1991 | ............... D04B 1/18 |
| JP | 2615131 B2 | 5/1997 | |
| JP | 10508916 A | 9/1998 | |
| JP | 10292225 A | 11/1998 | |
| JP | 2887402 B2 | 4/1999 | |
| JP | 3228351 B2 | 11/2001 | |
| JP | 2002121537 A | 4/2002 | |
| JP | 2003113303 A | 4/2003 | |
| JP | 2005187995 A | 7/2005 | |
| JP | 2009007681 A | 1/2009 | |
| KR | 100227005 B1 | 10/1999 | |
| WO | 1997/009473 A1 | 3/1997 | |

(Continued)

OTHER PUBLICATIONS

International Search Report and Written Opinion Received for PCT Application No. PCT/JP2012/064957, dated Aug. 21, 2012, 14 pages.

(Continued)

*Primary Examiner* — Lynda Salvatore
(74) *Attorney, Agent, or Firm* — Bridget C. Sciamanna; Kathleen Tyrrell

(57) ABSTRACT

In order to provide a polyurethane yarn having exceptional performance in terms of resistance to chlorine embrittlement essentially without the use of zinc, which is a heavy metal, and having advantageous application particularly in swimwear; as well as a fabric and article of swimwear using the polyurethane yarn, the present invention is a polyurethane yarn characterized in containing a partially hindered phenol compound having at least one partially hindered hydroxyphenyl group and a molecular weight of 300 or more, and a synthetic carbonate comprising one metal selected from the group consisting of alkali metals and alkaline-earth metals. The polyurethane yarn and other fibers are combined to yield a fabric and article of swimwear.

7 Claims, No Drawings

(56) References Cited

FOREIGN PATENT DOCUMENTS

| | | |
|---|---|---|
| WO | 2007/074814 | 7/2007 |
| WO | 2008/029997 | 3/2008 |
| WO | 2012176648 A1 | 12/2012 |

OTHER PUBLICATIONS

International Preliminary Report and Patentability Report Received for PCT Patent Application No. PCT/JP2012/064957, dated Jan. 9, 2014, 12 Pages.

* cited by examiner

US 10,882,973 B2

POLYURETHANE YARN, AS WELL AS FABRIC AND SWIMWEAR USING SAME

TECHNICAL FIELD

The present invention relates to a polyurethane yarn, as well as a fabric and swimwear using the polyurethane yarn. More particularly, the present invention relates to a polyurethane yarn capable of improving durability against chlorine in a chlorinated water environment such as a swimming pool, as well as a fabric and swimwear using the polyurethane yarn.

PRIOR ART

It is known that the elastic function of a polyurethane yarn is essentially lost and thread breakage occurs when swimwear using a dyed fabric of an interknit or interwoven polyurethane yarn and another fiber is repeatedly exposed to chlorinated water in a pool containing an active chlorine concentration of 0.5-3 ppm.

Although an ester polyurethane yarn having an aliphatic polyester diol as an ingredient is preferred to improve the chorine resistance of polyurethane yarn, even this has insufficient chlorine resistance. Aliphatic polyesters also have high bioactivity, and thus have the drawback that polyester polyurethane yarns are prone to infiltration of mold, as well as the problems that the elastic function of swimwear is reduced and thread breakage tends to occur during use or storage.

Polyether polyurethane yarn having a polyether diol with very little bioactivity as an ingredient, on the other hand, has little risk of embrittlement due to mold, but has the problem of poorer chlorine resistance than polyester polyurethane yarn.

Various additives—namely, inorganic chlorine deterioration inhibitors—have been proposed to improve the chlorine resistance of polyether polyurethane yarn. For example, zinc oxide (see Patent Document 1), a solid solution of magnesium oxide and zinc oxide (see Patent Document 2), a zinc oxide-based solid solution of aluminum dissolved in zinc oxide crystals (see Patent Document 3), and a complex oxide of zinc and aluminum (see Patent Document 4) have been disclosed as inorganic chlorine deterioration inhibitors containing zinc. These inorganic chlorine deterioration inhibitors, however, have the concern that zinc, which is a heavy metal, will bleed out, accumulate, and pollute the environment during the dyeing process, when worn as a swimwear product, or when disposed.

Magnesium oxide, aluminum oxide, or the like (see Patent Document 5), magnesium hydroxide, aluminum hydroxide, hydrotalcite, or the like (see Patent Documents 6 and 7), and a mineral mixture of huntite and hydromagnesite (see Patent Document 8) have been disclosed as inorganic chlorine deterioration inhibitors which do not contain zinc. These inhibitors, however, have poorer performance in terms of chlorine resistance than inorganic chlorine deterioration inhibitors which contain zinc.

A polyurethane yarn containing a synthetic carbonate of calcium carbonate or magnesium carbonate has also been disclosed (see Patent Document 9). Such a polyurethane yarn, however, was intended to have increased hot melt adhesion, and has poor performance in terms of chlorine resistance.

PRIOR ART DOCUMENTS

Patent Documents

Patent Document 1: Japanese Examined Patent Publication No. S60-43444
Patent Document 2: Japanese Patent Publication No. 3228351
Patent Document 3: Japanese Unexamined Patent Publication No. 2002-121537
Patent Document 4: Japanese Unexamined Patent Publication No. H10-292225
Patent Document 5: Japanese Examined Patent Publication No. S61-35283
Patent Document 6: Japanese Unexamined Patent Publication No. S59-133248
Patent Document 7: Japanese Patent Publication No. 2887402
Patent Document 8: Japanese Translation of IPC Patent Publication No. H10-508916
Patent Document 9: Japanese Unexamined Patent Publication No. 2009-7681

SUMMARY OF THE INVENTION

Problems that the Invention is to Solve

An object addressed by the present invention is to provide a polyurethane yarn capable of achieving excellent chlorine resistance without containing a heavy metal such as zinc, as well as a fabric and swimwear using the polyurethane yarn.

Means of Solving the Problems

The present invention for solving the problems employs any of the following means.
(1) A polyurethane yarn, characterized in containing a partially hindered phenol compound having at least one partially hindered hydroxyphenyl and a molecular weight of 300 or greater, and a synthetic carbonate comprising one metal selected from among a group consisting of alkali metals and alkaline earth metals.
(2) The polyurethane yarn according to (1), characterized in containing 0.15-4 wt % of the partially hindered phenol compound, and 0.5-10 wt % of the synthetic carbonate comprising one metal selected from among a group consisting of alkali metals and alkaline earth metals.
(3) The polyurethane yarn according to (1) or (2), characterized in that the partially hindered phenol compound is a compound containing at least two partially hindered hydroxyphenyls, and having a skeleton selected from among bis esters and alkylidenes.
(4) The polyurethane yarn according to any of (1)-(3), characterized in that the partially hindered phenol compound is ethylene-1,2-bis(3,3-bis[3-t-butyl-4-hydroxyphenyl]butyrate.
(5) The polyurethane yarn according to any of (1)-(4), characterized in that the synthetic carbonate is calcium carbonate or magnesium carbonate.
(6) A fabric, characterized in combining the polyurethane yarn according to any of (1)-(5) and another fiber.
(7) The fabric according to (6), characterized in that the other fiber is a polyamide fiber and/or a polyester fiber.
(8) An article of swimwear using the fabric according to (6) or (7).

Effects of the Invention

The present invention can provide a polyurethane yarn, a fabric, and swimwear having excellent durability with little deterioration due to chlorinated water in a swimming pool or the like, even without containing a heavy metal that may pollute the environment, by containing a partially hindered phenol compound having at least one partially hindered hydroxyphenyl and a molecular weight of 300 or greater, and a synthetic carbonate comprising one metal selected from among a group consisting of alkali metals and alkaline earth metals.

DESCRIPTION OF EMBODIMENTS

The present invention will be described in greater detail hereinafter.

The polyurethane yarn of the present invention basically comprises polyurethane or the like. First, the polyurethane will be described.

The polyurethane used in the present invention may be any polyurethane, and is not specifically limited provided that the starting materials are a polymer diol and a diisocyanate. The method of synthesizing the polyurethane is not specifically limited. Specifically, for example, the polyurethane may be a polyurethane urea comprising a polymer diol, a diisocyanate, and a low molecular weight diamine, or a polyurethane urethane comprising a polymer diol, a diisocyanate, and a low molecular weight diol. The polyurethane may also be a polyurethane urea using a compound having a hydroxyl and an amino in the molecule as a chain extender. A trifunctional or greater multifunctional glycol, isocyanate, or the like is preferably used within a range that does not interfere with the effects of the present invention.

The polymer diol is preferably a polyether or polyester diol, a polycarbonate diol, or the like. Using a polyether diol is especially preferred from the standpoint of imparting softness and ductility to the yarn.

The polyether diol is preferably, for example, polyethylene oxide, polyethylene glycol, a polyethylene glycol derivative, polypropylene glycol, polytetramethylene ether glycol (hereafter abbreviated as PTMG), a modified PTMG which is a copolymer of tetrahydrofuran (THF) and 3-methyltetrahydrofuran, a modified PTMG which is a copolymer of THF and 2,3-diemethyl-THF, a polyol having side chains on both sides as disclosed, for example, by Japanese Patent Publication No. 2615131, a random copolymer having an irregular arrangement of THF and ethylene oxide and/or propylene oxide, or the like. One, or a mixture or copolymer of two or more of these polyether diols may be used.

Butylene adipate, polycaprolactone diol, a polyester diol such as a polyester polyol, having a side chain as disclosed, for example, by Japanese Unexamined Patent Publication No. S61-26612, a polycarbonate diol as disclosed, for example, by Japanese Examined Patent Publication No. H2-289516, or the like is preferably used from the standpoint of imparting light stability and wear resistance as a polyurethane elastic yarn.

Such a polymer diol may be used alone, or in a mixture or copolymer of two or more.

The molecular weight of the polymer diol is a number average molecular weight of preferably 1000 to 8000, and more preferably 1500 to 6000, from the standpoint of imparting ductility, strength, heat resistance, and the like when formed as a yarn. Using a polyol having a molecular weight in this range can easily obtain an elastic yarn having excellent ductility, strength, elastic resilience, and heat resistance.

Next, for the diisocyanate, an aromatic diisocyanate such as diphenylmethane diisocyanate (hereafter abbreviated as MDI), tolylene diisocyanate, benzene 1,4-diisocyanate, xylylene diisocyanate, or 2,6-naphthelene diisocyanate is especially advantageous for synthesizing a polyurethane having high strength and heat resistance. Preferred alicyclic diisocyanates are, for example, methylenebis(cyclohexyl isocyanate), isophorone diisocyanate, methylcyclohexane 2,4-diisocyanate, methylcyclohexane 2,6-diisocyanate, cyclohexane 1,4-diisocyanate, hexahydroxylylene diisocyanate, hexahydrotolylene diisocyanate, octahydro-1,5-naphthalene diisocyanate, and the like. An aliphatic diisocyanate can be used especially effectively for minimizing yellowing of a polyurethane elastic yarn. These diisocyanates may be used alone or in combination.

Next, the chain extender used when synthesizing a polyurethane is preferably at least one from among low molecular weight diamines and low molecular weight diols. The chain extender is preferably a compound having a hydroxyl and an amino in the molecule, such as ethanolamine.

Preferred low molecular weight diamines are, for example, ethylenediamine, 1,2-propanediamine, 1,3-propanediamine, hexamethylenediamine, p-phenylenediamine, p-xylylenediamine, m-xylylenediamine, p,p'-methylenedianiline, 1,3-cyclohexyldiamine, hexahydro metaphenylenediamine, 2-methylpentamethylenediamine, bis(4-aminophenyl)phosphine oxide, and the like. One or more from among these is preferably used. Ethylenediamine is especially preferred. Using ethylenediamine can easily obtain a yarn having ductility, elastic resilience, and excellent heat resistance. A triamine compound capable of forming a cross-linked structure with these chain extenders, such as diethylenetriamine, may be added at a content that does not impair the effects.

Typical low molecular weight diols are ethylene glycol, 1,3-propanediol, 1,4-butanediol, bishydroxyethoxybenzene, bishydroxyethylene terephthalate, 1-methyl-1,2-ethanediol, and the like. One or more from among these is preferably used. Ethylene glycol, 1,3-propanediol, and 1,4-butanediol are especially preferred. Using these can obtain a yarn having higher heat resistance and higher strength as a polyurethane having diol extension.

The molecular weight of the polyurethane in the present invention is preferably in a range of a number average molecular weight of 30,000 to 150,000 from the standpoint of obtaining a fiber having high durability and strength. The molecular weight is measured by GPC and converted from polystyrene.

One or a mixture of two or more terminal sequestering agents is preferably used in the polyurethane. The terminal sequestering agent is preferably a monoamine such as dimethylamine, diisopropylamine, ethyl methylamine, diethylamine, methyl propylamine, isopropyl methylamine, diisopropylamine, butyl methylamine, isobutyl methylamine, isopentyl methylamine, dibutylamine, or diamylamine, a monool such as ethanol, propanol, butanol, isopropanol, allyl alcohol, or cyclopentanol, or a monoisocyanate such as phenylisocyanate.

In the present invention, a polyurethane yarn comprising a polyurethane having the basic structure described above must contain both a partially hindered phenol compound having at least one partially hindered hydroxyphenyl and a molecular weight of 300 or greater, and a synthetic carbonate comprising one metal selected from among a group consisting of alkali metals and alkaline earth metals. Containing this combination of additives can achieve a great synergistic effect in achieving an excellent effect resisting chlorine deterioration.

The partially hindered phenol compound used in the present invention preferably contains at least two partially hindered hydroxyphenyls, and has a skeleton selected from among bis esters and alkylidenes. The alkyl in the ring position next to the hydroxyl in the hydroxyphenyl is more preferably tertiary butyl, and the hydroxyl equivalents are more preferably 600 or less.

Such a partially hindered phenol compound is preferably, for example, ethylene-1,2-bis(3,3-bis[3-t-butyl-4-hydroxyphenyl]butyrate (the following chemical formula 1) having a structure in which a partially hindered hydroxyphenyl is covalently bonded to a bis ester skeleton.

CHEMICAL FORMULA 1

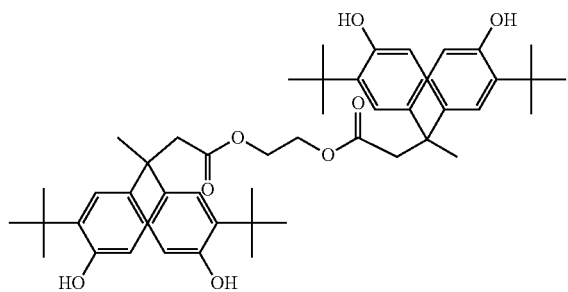

Containing the partially hindered phenol compound described above can increase the effect resisting chlorine deterioration. The content of the partially hindered phenol compound is preferably 0.15-4 wt %, and more preferably 0.5-3.5 wt %, of the weight of fiber from the standpoint of achieving sufficient effect and having no negative impact on the physical characteristics of the fiber.

The polyurethane yarn of the present invention must also contain a synthetic carbonate comprising one metal selected from among a group consisting of alkali metals and alkaline earth metals, as well as the partially hindered phenol compound.

Such alkali metals are periodic group IA metals such as lithium, sodium, potassium, rubidium, or cesium, and such alkaline earth metals are periodic group IIA metals such as magnesium, calcium, or strontium.

While carbonates of these metals may be created by crushing carbonates produced naturally or by chemical synthesis, the carbonate used in the present invention is a so-called synthetic carbonate created by chemical synthesis. In the case that a carbonate created not by synthesis, but by crushing a mineral produced naturally (such as huntite (approximately $Mg_3Ca(CO_3)_4$) or hydromagnesite (approximately $Mg_4(CO_3)_4 \cdot Mg(OH)_2 \cdot 4H_2O$)) or heavy calcium carbonate or the like is used, several per cent of heavy metal compounds such as Fe, Mn, Zn, or As compounds may be mixed in due to impurities in the mineral.

The method for synthesizing the synthetic carbonate may be any method provided that it is a chemical synthesis method. In the case of calcium carbonate ($CaCO_3$), the method may be a milk of lime-carbonic acid gas method of firing limestone, which is a mineral comprising primarily natural calcium carbonate, to degrade to carbonic acid gas and calcium oxide (quicklime), and obtaining homogenous calcium carbonate again from calcium hydroxide (milk of lime) and carbonic acid gas; or another method such as a calcium chloride-soda ash method or a milk of lime-soda ash method.

Synthetic carbonates have an even composition which can be refined so as to contain 0.1% or less of heavy metal compounds such as an Fe, Mn, Zn, or As compounds, excellent coloration, easy porous formation in the case of a fine powder due to obtaining by precipitating from a solute starting with water in most fabrication methods, and excellent dispersibility in polyurethane due to having a high specific surface area and low specific gravity. Synthetic carbonates can achieve the effects of the present invention, such as excellent high-strength ductility, high resilience, and high heat resistance, and good chlorine resistance, due to being stable and having little change in characteristics at the heating temperatures to which the polyurethane yarn is exposed during the spinning process and higher working processes; namely, a temperature range of about 80° C. to about 300° C.

The synthetic carbonate of an alkali metal or synthetic carbonate of an alkaline earth metal used in the present invention is, for example, potassium bicarbonate, potassium carbonate ($K_2CO_3$), calcium bicarbonate ($Ca(HCO_3)_2$), calcium carbonate ($CaCO_3$), sodium bicarbonate ($NaHCO_3$), sodium carbonate ($Na_2CO_3$), lithium carbonate ($Li_2CO_3$), magnesium carbonate ($MgCO_3$), or the like, and may be a complex salt containing an oxide, a hydroxide, a chloride, or the like, or a water of crystallization; that is, a hydrate. These carbonates may be used alone, mixed, or as a mixed solid solution. For example, in the case of magnesium carbonate, examples include a decahydrate ($Na_2CO_3 \cdot 10H_2O$) or a monohydrate ($Na_2CO_3 \cdot H_2O$) in the case of sodium carbonate and a basic magnesium carbonate ($mMgCO_3 \cdot Mg(OH)_2 \cdot nH_2O$) precipitated by adding sodium carbonate or potassium carbonate to an aqueous solution of a magnesium salt. Among these, a synthetic carbonate of calcium or a synthetic carbonate of magnesium is preferred from the standpoint of obtaining a higher product having stable physical properties and a low content of impurity elements.

Containing such an alkali metal and/or alkaline earth metal synthetic carbonate as well as the partially hindered phenol compound can increase the effect resisting chlorine deterioration. The content of the alkali metal and/or alkaline earth metal synthetic carbonate is preferably 0.5-10 wt %, more preferably 1-5 wt %, and even more preferably 2-4 wt % of the weight of the fiber from the standpoint of achieving sufficient effect and having no negative impact on the physical characteristics of the fiber.

This alkali metal and/or alkaline earth metal synthetic carbonate is spun by mixing into a spinning solution, and therefore is preferably a fine powder having an average particle size of 2 μm or less, and even more preferably a fine powder having an average particle size of 1 μm or less, from the standpoint of spinning stability. An average primary particle size of 0.01 μm or greater is preferred from the standpoint of dispersibility, due to increased cohesive force and difficulty mixing evenly into an spinning base solution if the average primary particle size is less than 0.01 μm.

To finely pulverize this alkali metal and/or alkaline earth metal synthetic carbonate, a method is preferably used of mixing the alkali metal and/or alkaline earth metal synthetic carbonate with N,N-dimethylacetamide (hereafter abbreviated as DMAc), dimethylformamide (hereafter abbreviated as DMF), dimethylsulfoxide (hereafter abbreviated as DMSO), N-methylpyrrolidone (hereafter abbreviated as NMP), or the like or a solvent having these as the main component, and other additives such as a thickener, to prepare a slurry, and crushing the slurry using a vertical or horizontal mill or the like.

An alkali metal and/or alkaline earth metal synthetic carbonate that has been surface-treated with, for example, an organic substance such as a fatty acid, a fatty acid ester, a phosphoric acid ester, or a polyol-based organic substance, a silane coupling agent, a titanate coupling agent, water glass, a fatty acid metal salt, or a mixture of these is preferably used with the objects of improving the dispersibility of this alkali metal and/or alkaline earth metal synthetic carbonate in the yarn, stabilizing spinning, and the like.

The polyurethane yarn of the present invention may contain various stabilizers, pigments, or the like as required. For example, a sterically hindered phenol-based chemical agent, starting with so-called BHT, "Sumilizer" (registered trademark) GA-80 made by Sumitomo Chemical Co., Ltd., or the like, a benzotriazole- or benzophenone-based chemical agent such as "Tinuvin" (registered trademark) made by Ciba-Geigy Corporation, a phosphorus-based chemical such as "Sumilizer" P-16 made by Sumitomo Chemical Co., Ltd., various hindered amine-based chemical agents, an inorganic pigment such as titanium oxide or carbon black, a fluorine- or silicone-based resin powder based on vinylidene polyfluoride or the like, or a metal soap such as magnesium stearate as a light resistance agent, an antioxidant, or the like; a germicide including silver, zinc, compounds of these, or the like; a deodorant; a lubricant such as silicone or mineral oil; various antistatic agents such as barium sulfate, cerium oxide, betaine, or a phosphoric acid or phosphoric acid ester compound; or the like may be added and reacted with the polymer to remain present. The polyurethane yarn preferably also contains a nitrogen oxide scavenger such as HN-150 made by Nippon Hydrazine Co., Ltd., or "Hostanox" (registered trademark) SE10 made by Clariant Corporation, a thermo-oxidation stabilizer such as "Sumilizer" GA-80 made by Sumitomo Chemical Co., Ltd., a light stabilizer such as "Sumilizer" (registered trademark) 300#622 made by Sumitomo Chemical Co., Ltd., or the like to further increase durability, especially against light, nitrogen oxides, and the like.

Next, the method of manufacturing the polyurethane yarn of the present invention will be described in detail.

In the present invention, a polymer diol and a diisocyanate are used as starting materials, and a polyurethane spinning base solution obtained from these starting materials is made to contain a partially hindered phenol compound having at least one partially hindered hydroxyphenyl and a molecular weight of 300 or greater, and a synthetic carbonate comprising one metal selected from among a group consisting of alkali metals and alkaline earth metals, then spun. From the standpoint of stabilizing polymerization, a polyurethane solution is preferably prepared beforehand, and this solution is combined with a partially hindered phenol compound having at least one partially hindered hydroxyphenyl and a molecular weight of 300 or greater, and a synthetic carbonate comprising one metal selected from among a group consisting of alkali metals and alkaline earth metals.

The method of preparing the solution solute of polyurethane may be any of melt polymerization, solution polymerization, or another method. Solution polymerization, however, is more preferred. In the case of solution polymerization, the polyurethane generates little foreign matter such as a gel, is easy to spin, and readily yields a polyurethane elastic yarn of low fineness. Obviously, solution polymerization has the advantage that the operation of preparing a solution is omitted.

An especially advantageous polyurethane in the present invention is synthesized using PTMG having a molecular weight of 1500 to 6000 as a polymer diol, MDI as a diisocyanate, and at least one from among ethylenediamine, 1,2-propanediamine, 1,3-propanediamine, and hexamethylenediamine as a chain extender.

The polyurethane is obtained, for example, by synthesis using the ingredients described earlier in DMAc, DMF, DMSO, NMP, or the like or a solvent having these as the main component. For example, especially advantageous methods which may be employed are a so-called one-shot method of throwing the ingredients into such a solvent to dissolve, and heating and reacting to form a polyurethane; a method of first melting and reacting the polymer diol and the diisocyanate, then dissolving the reaction product in a solvent and reacting with the chain extender described earlier to form a polyurethane; and the like.

In the case that a diol is used as a chain extender, adjusting the melting point of the polyurethane on the high temperature side to a range of 200° C. to 260° C. is preferred from the standpoint of obtaining a polyurethane having excellent heat resistance. A typical method of achieving this adjustment is by controlling the type and ratio of the polymer diol, MDI, and the diol. In the case that the polymer diol has a low molecular weight, increasing the relative proportion of MDI can yield a polyurethane having a high melting point on the high temperature side. Similarly, in the case that the diol has a low molecular weight, reducing the relative proportion of the polymer diol can yield a polyurethane having a high melting point on the high temperature side.

In the case that the polymer diol has a molecular weight of 1800 or greater, polymerization preferably takes place with a ratio of (number of moles of MDI)/(number of moles of the polymer diol)=1.5 or greater to make the melting point on the high temperature side 200° C. or greater.

One or a mixture of two or more catalysts, such as amine catalysts or organic metal catalysts, is preferably used during such synthesis of the polyurethane.

Examples of amine catalysts are N,N-dimethyl cyclohexylamine, N,N-dimethyl benzylamine, triethylamine, N-methylmorpholine, N-ethylmorpholine, N,N,N',N'-tetramethyl ethylenediamine, N,N,N',N'-tetramethyl-1,3-propanediamine, N,N,N',N'-tetramethyl hexanediamine, bis-2-dimethylaminoethyl ether, N,N,N',N',N'-pentamethyl diethylenetriamine, tetramethylguanidine, triethylenediamine, N,N'-dimethylpiperazine, N-methyl-N'-dimethylaminoethyl-piperazine, N-(2-dimethylaminoethyl)morpholine, 1-methylamidazole, 1,2-dimethylamidazole, N,N-dimethylaminoethanol, N,N,N'-trimethylaminoethyl ethanolamine, N-methyl-N'-(2-hydroxyethyl)piperazine, 2,4,6-tris(dimethylaminomethyl)phenol, N,N-dimethylaminohexanol, triethanolamine, and the like.

Examples of organic metal catalysts are tin octanoate, dibutyltin dilaurate, lead dibutyl octanoate, and the like.

The concentration of polyurethane in the polyurethane solution obtained in this way is preferably in a range of usually 30 wt % to 80 wt %.

To improve durability against chlorine in pool water, in the present invention, such a polyurethane solution contains a partially hindered phenol compound having at least one partially hindered hydroxyphenyl and a molecular weight of 300 or greater, and a synthetic carbonate comprising one metal selected from among a group consisting of alkali metals and alkaline earth metals. The method for containing the partially hindered phenol compound having at least one partially hindered hydroxyphenyl and a molecular weight of 300 or greater in the spinning base solution may be to mix with the spinning base solution by itself, or to mix with the alkali metal and/or alkaline earth metal synthetic carbonate beforehand. Any method may be employed when adding the partially hindered phenol compound having at least one partially hindered hydroxyphenyl and a molecular weight of 300 or greater and the alkali metal and/or alkaline earth metal synthetic carbonate to the polyurethane solution. As typical methods, various means may be employed such as a method using a static mixer, a method using stirring, a method using a homomixer, or a method using a biaxial extruder.

To improve durability against chlorine in pool water, in the present invention, the polyurethane yarn preferably contains the partially hindered phenol compound having at least one partially hindered hydroxyphenyl and a molecular weight of 300 in a range of, for example, 0.15 wt % to 4.0 wt %, and the alkali metal and/or alkaline earth metal synthetic carbonate in a range of, for example, 0.5 wt % to 10 wt %. For this purpose, the alkali metal and/or alkaline earth metal synthetic carbonate must be dispersed evenly in the polyurethane spinning base solution. The alkali metal and/or alkaline earth metal synthetic carbonate is preferably added to a polyurethane spinning base solution using a solvent such as N,N-dimethylformamide or N,N-dimethylacetamide, and stirred and mixed to disperse evenly. Specifically, the alkali metal and/or alkaline earth metal synthetic carbonate is preferably dispersed in a solvent such as N,N-dimethylformamide or N,N-dimethylacetamide beforehand to form a dispersion of the alkali metal and/or alkaline earth metal synthetic carbonate, and this dispersion is mixed with the polyurethane spinning base solution. From the standpoint of combining evenly with the polyurethane solution, the solvent of the dispersion of the alkali metal and/or alkaline earth metal synthetic carbonate to be combined with this base solution is preferably the same solvent as used in the polyurethane solution. The chemical agents or pigments described earlier, for example, a light resistance agent, an antioxidant, or the like, may be added simultaneously during addition of the alkali metal and/or alkaline earth metal synthetic carbonate to the polyurethane solution.

The polyurethane yarn of the present invention may be obtained, for example, by dry spinning, wet spinning, or melt spinning the spinning base solution constituted as described earlier, then winding. Among these, dry spinning is preferred from the standpoint of capacity to stably spin all degrees of fineness from thin fabrics to draperies.

The fineness, cross-sectional shape, and the like of the polyurethane yarn of the present invention are not specifically limited. For example, the cross-sectional shape of the yarn may be circular or elliptical.

The dry spinning method is not specifically limited, and suitable spinning conditions and the like may be selected for spinning according to the characteristics desired or the spinning equipment.

The spinning speed is preferably 250 m/min or greater from the standpoint of improving the strength of the resulting polyurethane elastic yarn.

The polyurethane yarn of the present invention is made into a fabric, for example, by mixing with another fiber. Although not specifically limited, the other fiber is preferably a polyester fiber or a polyamide fiber from the standpoint of durability and appearance. For example, the other fiber may be a polyester, a cationic dyeable polyester, Nylon 66, or Nylon 6, but is not limited to these. These fibers may contain additives such as a flatting agent, a stabilizer, or an antistatic agent. A polyurethane yarn interknit or interwoven with another fiber may use the bare yarn as is, or a worked yarn such as a balling yarn wound around the other fiber.

Various interknitting methods are used to fabricate a knitted fabric comprising a polyurethane yarn and another fiber. An interknit knitted fabric may use warp knitting or weft knitting, and may be, for example, a tricot, a Raschel knit, or a circular knit. The knit structure may be any knit structure, such as a half knit, a reverse half knit, a double Atlas knit, or a double Denbigh knit.

A weave comprising a polyurethane yarn and another fiber is woven using a conventional method. The weave may be a one-way stretch fabric using only the warp or the weft, or a two-way stretch fabric using both the warp and the weft.

A fabric comprising a polyurethane yarn and another fiber is scoured, relaxed, and set under conventional conditions. The fabric is usually dyed using a suitable dye, having a high mixing rate in fabrics, and suitable conditions for the other fiber. The dye may be a disperse dye, an acid dye, a premetallized dye, or another conventional dye. The fabric may be subjected to a fixing treatment to fix the dye, an antibiotic treatment, a softening treatment, a water repelling treatment, or the like as required.

Applications of a fabric comprising the polyurethane yarn of the present invention and another fabric include swimwear, various types of stretch foundations such as girdles, brassieres, intimate apparel, or underwear, ribs for socks, tights, panty stockings, waistbands, bodysuits, spats, stretch sportswear, stretch outer wear, bandages, athletic supporters, medical wear, stretch linings, paper diapers, and the like. The fabric is especially advantageously applied to swimwear to be worn in a pool. The resulting swimwear has little deterioration due to chlorinated water in swimming pools or the like, and excellent durability.

EXAMPLES

The present invention will be described in greater detail using examples.

Characteristics of fabrics and yarns were measured by the following methods.

Fabric Capacity to Resist Chlorine Embrittlement

Chlorine water was prepared by diluting with ion exchange water to bring the effective chlorine concentration to 3 ppm, combining with urea to bring the urea concentration to 2 ppm, and buffering to pH 7.2 with a buffer solution of dilute sulfuric acid. This chlorine water was placed in a constant temperature bath adjusted to a temperature of 35° C., a knitted fabric was immersed while stretched 50% horizontally, and the time was measured until broken polyurethane yarn was observed in the knitted fabric. Thread breakage was checked every twelve hours, and the measurement was found from the average of n=3.

Determination of Zinc Content in Fabric

The zinc content in fabric was measured by raw yarn absorptiometry. The limit of detection was 1 ppm, and the measurement was found from the average of n=2.

Measurement of Zinc Portion in Polyurethane Yarn

The zinc portion in polyurethane yarn was measured by raw yarn absorptiometry. The limit of detection was 1 ppm, and the measurement was found from the average of n=2.

Determination of Partially Hindered Phenol Compound in Polyurethane Yarn

One gram of a sample (polyurethane yarn) was weighed and placed in 20 mL of methanol to extract the partially hindered phenol compound for 24 hours at 23° C. The extract was measured by high speed liquid chromatography at a measurement wavelength of 280 nm. The measurement was found from the average of n=2, and the determination was found according to the following formula from a standard solution prepared beforehand.

$$\text{Content (wt \%)} = \frac{\text{Yarn sample peak area} \times \text{Calibration curve sample weight} \times 100}{\text{Calibration curve peak area} \times \text{Yarn sample weight}} \quad \text{NUMERICAL FORMULA 1}$$

Determination of Metals in Polyurethane Yarn

First, the polyurethane yarn was analyzed by raw yarn absorptiometry, and the weight of metal contained was measured by type of metal. The measurement was found from the average of n=2.

Next, 1 g of the polyurethane yarn was completely dissolved in 10 mL of DMAc and placed in a centrifuge to extract a precipitate. The precipitate was then washed with DMAc and dried for two days at room temperature. When dry, the precipitate was subjected to IR analysis to identify the metal compound.

The content of metal compound contained in the polyurethane yarn was found by the following formula on the basis of the results for the type and weight of the metal by raw yarn absorptiometry and the results for the metal compound identified by IR analysis.

$$\text{Content of metal compound (wt \%)} = \frac{\text{Formula weight of identified metal compound} \times \text{Metal content in yarn (ppm)}}{\text{Molecular weight of identified metal} \times 10{,}000} \quad \text{NUMERICAL FORMULA 2}$$

Method of Fabrication of Polyurethane Yarn and Polyamide Yarn

A two-weight tricot was knit by a conventional method using a 44-decitex, 34-filament Nylon 6 fiber (type 2694 (Nylon 6 made by Toray Industries, Inc.) (mixing rate: 83.5%) for the front, and a 44-decitex polyurethane yarn (mixing rate: 16.5%) for the back.

After scouring in a three-tank continuous relax scouring machine, the mixed tricot knitted fabric was preset on a pin stenter, then dyed using a jet dyeing machine. The conditions during these treatments were as follows.

Scouring treatment: For the treatment water, a solution was prepared of 2 g/L of a nonionic surfactant "Sunmorl" (registered trademark) BL650 (made by Nicca Chemical Co., Ltd.), 0.5 g/L of soda ash, and 1500 ppm of an EDTA-based metal ion sequestering agent "Acromer [as transliterated]" (registered trademark) DH700 (made by Nagase ChemteX Corporation) combined with soft water having a total hardness of 10 ppm. This treatment solution was used to treat at 80° C. for twenty minutes.

Preset: The knitted fabric was preset at 190° C. for 45 seconds at a tentering rate of 10% (tentering rate of 10% of the fabric width after scouring) and the full length (same length as the fabric length after scouring: expansion rate of 0%).

Dying treatment: The knitted fabric was dyed to a concentration of 0.5% owf at 98° C. for 30 minutes using an acid dye "Kayanol milling turquoise blue 3G" (made by Nippon Kayaku Co., Ltd.).

Method of Fabricating Fabric of Polyurethane Yarn and Polyester Fiber

A two-weight tricot was knit by a conventional method using a 56-decitex, 24-filament cationic-dyeable polyester fiber (type FS92: made by Toray Industries, Inc.) (mixing rate: 85%) for the front, and a 44-decitex polyurethane yarn (mixing rate: 15%) for the back.

After scouring in a three-tank continuous relax scouring machine, the mixed tricot knitted fabric was preset on a pin stenter, then dyed using a jet dyeing machine. The conditions during these treatments were as follows.

Scouring treatment: For the treatment water, a solution was prepared of 2 g/L of a nonionic surfactant "Sunmorl" (registered trademark) BL650 (made by Nicca Chemical Co., Ltd.) and 1500 ppm of an EDTA-based metal ion sequestering agent "Acromer [as transliterated]" (registered trademark) DH700 (made by Nagase ChemteX Corporation) combined with soft water having a total hardness of 10 ppm. This treatment solution was used to treat at 80° C. for twenty minutes.

Preset: The knitted fabric was preset at 190° C. for 60 seconds at a tentering rate of 30% (tentering rate of 30% of the fabric width after scouring) and the full length (same length as the fabric length after scouring: expansion rate of 0%).

Dying treatment: The knitted fabric was dyed to a concentration of 8% owf at 125° C. for 60 minutes using an acid dye "Kayacryl Black" (registered trademark) FB-ED (made by Nippon Kayaku Co., Ltd.).

Example 1

MDI and PTMG having a molecular weight of 1800 were placed in a vessel at a molar ratio of MDI/PTMG=1.58/1 and reacted at 90° C., and the resulting reaction product was dissolved in N,N-dimethylacetamide (DMAc). Next, a DMAc solution containing ethylenediamine and diethylamine was combined with the solution in which the reaction product was dissolved to prepare a polyurethane urea solution (A1) having 35 wt % of solid parts in the polymer.

A condensation polymer of p-cresol and divinylbenzene ("Metacrol [as transliterated]" (registered trademark) 2390 made by Du Pont), as an antioxidant, and 2-[4,6-bis(2,4-dimethylphenyl)-1,3,5-triazin-2-yl]-5-(octyloxy)phenyl ("Cyasorb" (registered trademark) 1164 made by Cytech Inc.), as an ultraviolet absorber, were mixed at a ratio (by weight) of 3/2, and a DMAc solution of these (concentration: 35 wt %) was prepared as additive solution B1 (35 wt %).

The polyurethane urea solution (A1) and the additive solution (B1) were mixed at ratios of 98 wt % and 2 wt % to form polymer solution (X1).

Ethylene-1,2-bis(3,3-bis[3-t-butyl-4-hydroxyphenyl]butyrate ("Hostanox" (registered trademark) 03 made by Clariant Corporation) was dissolved in DMAc as a partially hindered phenol compound to prepare a 35 wt % concentration solution (C1).

Calcium carbonate Hakuenka A ($CaCO_3$, average primary particle size: 1.0 μm) made by Shiraishi Kogyo Kaisha, Ltd., was used as a chlorine deterioration inhibitor to prepare a 35 wt % DMAc dispersion. During this preparation, a horizontal mill DYNO-MIL KDL made by Willy A. Bachofen AG was used, and packed with 85% Zirconia beads to evenly micro-disperse under a condition of a flow rate of 80 g/min and form a DMAc dispersion D1 of a synthetic carbonate (35 wt %).

The polymer solutions X1, C1, and D1 were mixed at ratios of 97 wt %, 1 wt %, and 2 wt % to prepare a spinning base solution Y1. The spinning base solution Y1 was spun by dry spinning at a winding speed of 580 m/min to manufacture and wind a polyurethane yarn (44 decitex, 4 filaments) (Z1).

This polyurethane yarn was used to fabricate a fabric, and the chlorine resistance and content of zinc in the fabric were measured. The results are shown in Table 1.

Example 2

The polymer solutions X1, C1, and D1 were mixed at ratios of 92 wt %, 3 wt %, and 5 wt % to prepare a spinning base solution Y2. The spinning base solution Y2 was spun by dry spinning at a winding speed of 580 m/min to manufacture and wind a polyurethane yarn (44 decitex, 4 filaments) (Z2).

This polyurethane yarn was used to fabricate a fabric, and the chlorine resistance and content of zinc in the fabric were measured. The results are shown in Table 1.

Example 3

A 35 wt % DMAc dispersion D2 was prepared by the same method as Example 1 using basic magnesium carbonate GP-30 ($4MgCO_3 \cdot Mg(OH)_2 \cdot 4H_2O$, average primary particle size: 1.5 μm) made by Konoshima Chemical Co., Ltd., as a chlorine deterioration inhibitor.

The polymer solutions X1, C1, and D2 were mixed at ratios of 93 wt %, 1 wt %, and 6 wt % to prepare a spinning base solution Y3. The spinning base solution Y3 was spun by dry spinning at a winding speed of 580 m/min to manufacture and wind a polyurethane yarn (44 decitex, 4 filaments) (Z3).

This polyurethane yarn was used to fabricate a fabric, and the chlorine resistance and content of zinc in the fabric were measured. The results are shown in Table 1.

Example 4

A 35 wt % concentration solution (C2) was prepared using 1,1,3-tris[2-methyl-5-t-butyl-4-hydroxyphenyl]butane ("Lowinox" (registered trademark) CA22 (made by Great Lakes Chemicals) instead of "Hostanox" (registered trademark) as the partially hindered phenol compound.

The polymer solutions X1, C2, and D1 were mixed at ratios of 94 wt %, 2 wt %, and 4 wt % to prepare a spinning base solution Y4. The spinning base solution Y4 was spun by dry spinning at a winding speed of 580 m/min to manufacture and wind a polyurethane yarn (44 decitex, 4 filaments) (Z4).

This polyurethane yarn was used to fabricate a fabric, and the chlorine resistance and content of zinc in the fabric were measured. The results are shown in Table 1.

Comparative Example 1

A 35 wt % DMAc dispersion D3 was prepared by the same method as Example 1 using zinc oxide (ZnO, average primary particle size: 0.2 μm) made by Honjo Chemical Corporation as a chlorine deterioration inhibitor.

The polymer solutions X1, C1, and D3 were mixed at ratios of 95 wt %, 2 wt %, and 3 wt % to prepare a spinning base solution Y5. The spinning base solution Y5 was spun by dry spinning at a winding speed of 580 m/min to manufacture and wind a polyurethane yarn (44 decitex, 4 filaments) (Z5).

This polyurethane yarn was used to fabricate a fabric, and the chlorine resistance and content of zinc in the fabric were measured. The results are shown in Table 1.

Comparative Example 2

The polymer solutions X1 and D1 were mixed at ratios of 95 wt % and 5 wt % to prepare a spinning base solution Y6. The spinning base solution Y6 was spun by dry spinning at a winding speed of 580 m/min to manufacture and wind a polyurethane yarn (44 decitex, 4 filaments) (Z6).

This polyurethane yarn was used to fabricate a fabric, and the chlorine resistance and content of zinc in the fabric were measured. The results are shown in Table 1.

Comparative Example 3

A 35 wt % DMAc dispersion D4 was prepared by the same method as Example 1 using a powder of hydrotalcite ($Mg_6Al_2(OH)_{16}CO_3 \cdot 4H_2O$) as a chlorine deterioration inhibitor.

The polymer solutions X1, C1, and D4 were mixed at ratios of 94 wt %, 2 wt %, and 4 wt % to prepare a spinning base solution Y7. The spinning base solution Y7 was spun by dry spinning at a winding speed of 580 m/min to manufacture and wind a polyurethane yarn (44 decitex, 4 filaments) (Z7).

This polyurethane yarn was used to fabricate a fabric, and the chlorine resistance and content of zinc in the fabric were measured. The results are shown in Table 1.

Comparative Example 4

The polymer solutions X1 and C1 were mixed at ratios of 97 wt % and 3 wt % to prepare a spinning base solution Y8. The spinning base solution Y8 was spun by dry spinning at a winding speed of 580 m/min to manufacture and wind a polyurethane yarn (44 decitex, 4 filaments) (Z8).

This polyurethane yarn was used to fabricate a fabric, and the chlorine resistance and content of zinc in the fabric were measured. The results are shown in Table 1.

TABLE 1

| | Polyurethane yarn | Partially hindered phenol compound in polyurethane yarn | Chlorine deterioration inhibitor in polyurethane yarn | Other fibers | Chlorine resistance (hours) | Zinc content (ppm) |
| --- | --- | --- | --- | --- | --- | --- |
| Example 1 | Z1 | Hostanox 03 1% | Calcium carbonate 2 wt % | Nylon | 108 | ≤1 |
| | | | | Cationic dyeable polyester | 120 | ≤1 |
| Example 2 | Z2 | Hostanox 03 3% | Calcium carbonate 5 wt % | Nylon | 116 | ≤1 |
| | | | | Cationic dyeable polyester | 128 | ≤1 |

TABLE 1-continued

|  | Polyurethane yarn | Partially hindered phenol compound in polyurethane yarn | Chlorine deterioration inhibitor in polyurethane yarn | Other fibers | Chlorine resistance (hours) | Zinc content (ppm) |
|---|---|---|---|---|---|---|
| Example 3 | Z3 | Hostanox 03 1% | Basic magnesium carbonate 6 wt % | Nylon<br>Cationic dyeable polyester | 110<br>120 | ≤1<br>≤1 |
| Example 4 | Z4 | Hostanox 03 2% | Calcium carbonate 4 wt % | Nylon<br>Cationic dyeable polyester | 96<br>100 | ≤1<br>≤1 |
| Comparative Example 1 | Z5 | Hostanox 03 2% | Zinc oxide 3 wt % | Nylon<br>Cationic dyeable polyester | 120<br>132 | 3896<br>3483 |
| Comparative Example 2 | Z6 | None | Calcium carbonate 5 wt % | Nylon<br>Cationic dyeable polyester | 48<br>52 | ≤1<br>≤1 |
| Comparative Example 3 | Z7 | Hostanox 03 2% | Hydrotalcite | Nylon<br>Cationic dyeable polyester | 72<br>80 | ≤1<br>≤1 |
| Comparative Example 4 | Z8 | Hostanox 03 3% | None | Nylon<br>Cationic dyeable polyester | 12<br>12 | ≤1<br>≤1 |

INDUSTRIAL APPLICABILITY

The polyurethane yarn of the present invention has little deterioration due to chlorinated water in a swimming pool or the like, and therefore is advantageous for providing fabric and swimwear having excellent durability.

The invention claimed is:

1. A solution spun polyurethane yarn capable of achieving chlorine resistance without containing zinc, said solution spun yarn consisting of
   (i) 0.15-4 wt% of a partially hindered phenol compound having at least one partially hindered hydroxyphenyl and a molecular weight of 300 or greater,
   (ii) 0.5-10 wt% of a synthetic carbonate selected from the group consisting of potassium bicarbonate, potassium carbonate, calcium bicarbonate, calcium carbonate, sodium bicarbonate, sodium carbonate, lithium carbonate and magnesium carbonate, or a complex salt or hydrate thereof, wherein said synthetic carbonate does not contain heavy metal impurities, and
   (iii) polyurethane,
   wherein the polyurethane yarn has an average molecular weight of 30,000 to 150,000 and wherein a fabric comprising the yarn exhibits a chlorine resistance of at least two-fold longer as compared to a fabric comprising a yarn without (i) or (ii).

2. The polyurethane yarn according to claim 1, wherein the partially hindered phenol compound is a compound containing at least two partially hindered hydroxyphenyls, and having a skeleton selected from among bis esters and alkylidenes.

3. The polyurethane yarn according to claim 1, wherein the partially hindered phenol compound is ethylene-1,2-bis (3,3-bis[3-t-butyl-4-hydroxyphenyl]butyrate.

4. The polyurethane yarn according to claim 1, wherein the synthetic carbonate is calcium carbonate or magnesium carbonate.

5. A fabric, formed by combining the polyurethane yarn according to claim 1 and another fiber.

6. The fabric according to claim 5, wherein the other fiber is a polyamide fiber and/or a polyester fiber.

7. An article of swimwear made using the fabric according to claim 5 or 6.

* * * * *